Patented Dec. 2, 1947

2,431,763

UNITED STATES PATENT OFFICE 2,431,763

MANUFACTURE OF POLYCYCLIC HYDROCARBONS

William J. Mattox, La Grange, Ill., assignor to Universal Oil Products Company, Chicago, Ill., a corporation of Delaware No Drawing. Application February 28, 1945, Serial No. 580,293

12 Claims. (Cl. 260—668)

This invention relates to the conversion of alkenyl aromatic hydrocarbons into polycyclic aromatic hydrocarbons.

An object of this invention is the production of polycyclic aromatic hydrocarbons from alkenyl aromatic hydrocarbons.

Another object of this invention is the conversion of a butenyl benzene into naphthalene.

One specific embodiment of the present invention comprises a process for producing a polycyclic aromatic hydrocarbon by reacting a substituted aromatic hydrocarbon containing at least one alkenyl group and at least one unsubstituted carbon atom in ortho position to said alkenyl group at an elevated temperature in the presence of a hydrogen halide.

Another embodiment of this invention comprises a process for producing a polycyclic aromatic hydrocarbon by reacting a substituted aromatic hydrocarbon containing at least one alkenyl substitutent group, the substituents including the alkenyl radical being attached to the nuclear carbon atoms ortho to each other and having a sum of at least 4 carbon atoms in straight chain arrangement, at an elevated temperature in the presence of a hydrogen halide.

A further embodiment of this invention comprises a process for producing a polycyclic aromatic hydrocarbon by reacting a substituted benzene hydrocarbon containing at least one alkenyl substituent group, the substituents including the alkenyl radical being attached to the nuclear carbon atoms ortho to each other and having a sum of at least 4 carbon atoms in straight chain arrangement, at an elevated temperature in the presence of a hydrogen halide and of a refractory metal oxide.

The substituted aromatic hydrocarbons utilizable in this process comprise aromatic hydrocarbons containing an alkenyl group having at least 4 carbon atoms in straight chain arrangement, as, for example, butenyl benzene. Also utilizable in this process are substituted aromatic hydrocarbons which in addition to the alkenyl group contain another substituent group comprising an alkyl or an alkenyl radical positioned on a carbon atom adjacent to the carbon atom to which is attached the alkenyl group. In compounds of this nature, the alkenyl group need not contain 4 carbon atoms in straight chain arrangement. It is necessary, however, that the sum of the carbon atoms in the substitent groups be at least 4. Examples of such compounds are 1-propenyl-2-methylbenzene, 1-butenyl-2-methylbenzene, 1-butenyl-2-ethylbenzene, and the like. In compounds where the sum of the carbon atoms in the substituent groups is more than 4, the products will be alkyl naphthalenes. Alkyl naphthalenes may also be produced by the process of this invention by reacting alkyl alkenyl aromatic hydrocarbons wherein the alkenyl group contains at least 4 carbon atoms in straight chain arrangement and wherein the alkyl group is not necessarily attached to a carbon atom adjacent to the carbon atom to which is attached the alkenyl group.

The hydrogen halides utilizable in this process preferably comprise the hydrides of a middle halogen such as hydrogen chloride and hydrogen bromide.

Refractory metal oxides suitable for use in this process comprise alumina, magnesia, silica, titania, zirconia, thoria, zinc oxide, and the like. They may be used alone or as composites with another oxide as, for example, silica-alumina.

The operation of the process is relatively simple and consists in vaporizing an alkenyl aromatic hydrocarbon, mixing the vapors with a hydrogen halide and passing the mixture over or in contact with a selected metal oxide catalyst. The products are separated by distillation or other suitable means. Unreacted alkenyl aromatic hydrocarbon is separated from the resulting polycyclic aromatic hydrocarbons and recycled for further conversion.

The temperatures utilizable in the process are from about 300° C. to about 600° C. and atmospheric pressure is often employed, although subatmospheric and moderately superatmospheric pressures are utilizable. Contact times are varied with the type and activity of the catalyst.

The following example is introduced to illustrate further the character of the invention, although with no intention of unduly limiting its proper scope:

The vapors of 4-phenyl-1-butene were mixed with approximately one-half mole of hydrogen chloride and passed over activated alumina at a temperature of 500° C. and at atmospheric pressure while charging the phenylbutene at an hourly liquid space velocity of 0.5. The resulting products were separated by distillation. The yield of naphthalene amounted to 24 weight per cent of the charge per pass. Approximately 39% of the phenylbutene was recovered in the distillation resulting in an overall naphthalene yield of 40%.

I claim as my invention:

1. A process for producing a polycyclic aromatic hydrocarbon which comprises reacting a substituted aromatic hydrocarbon containing at least one alkenyl group and at least one unsubstituted carbon atom in ortho position to said alkenyl group in the presence of a hydrogen halide at a temperature of from about 300° C. to about 600° C.

2. A process for producing a polycyclic aromatic hydrocarbon which comprises reacting a substituted aromatic hydrocarbon containing at least one alkenyl substituent group, the substituents including the alkenyl radical being attached to the nuclear carbon atoms ortho to each other and having a sum of at least 4 carbon atoms in straight chain arrangement, in the presence of a hydrogen halide at a temperature of from about 300° C. to about 600° C.

3. The process of claim 2 further characterized in that the reaction is effected in the presence of a hydrogen halide and a refractory metal oxide.

4. A process for producing a polycyclic aromatic hydrocarbon which comprises reacting a substituted benzene hydrocarbon containing at least one alkenyl substituent group, the substituents including the alkenyl radical being attached to the nuclear carbon atoms ortho to each other and having a sum of at least 4 carbon atoms in straight chain arrangement, in the presence of a hydride of a middle halogen at a temperature of from about 300° C. to about 600° C.

5. The process of claim 4 further characterized in that the reaction is effected in the presence of a hydride of a middle halogen and a refractory metal oxide.

6. A process for producing naphthalene which comprises reacting a butenyl benzene at a temperature of from about 300° C. to about 600° C. in the presence of a hydride of a middle halogen.

7. A process for producing naphthalene which comprises reacting a butenyl benzene at a temperature of from about 300° C. to about 600° C. in the presence of hydrogen chloride.

8. A process for producing naphthalene which comprises reacting a butenyl benzene at a temperature of from about 300° C. to about 600° C. in the presence of hydrogen bromide.

9. A process for producing naphthalene which comprises reacting a butenyl benzene at a temperature of from about 300° C. to about 600° C. in the presence of hydrogen chloride and of a refractory metal oxide.

10. A process for producing naphthalene which comprises reacting a butenyl benzene at a temperature of from about 300° C. to about 600° C. in the presence of hydrogen bromide and of a refractory metal oxide.

11. A process for producing naphthalene which comprises reacting a butenyl benzene at a temperature of from about 300° C. to about 600° C. in the presence of hydrogen chloride and of aluminum oxide.

12. A process for producing naphthalene which comprises reacting 4-phenyl-1-butene at a temperature of from about 300° C. to about 600° C. in the presence of hydrogen chloride and alumina.

WILLIAM J. MATTOX.

REFERENCES CITED

The following references are of record in the file of this patent:

UNITED STATES PATENTS

| Number | Name | Date |
|---|---|---|
| 2,272,266 | Grosse et al. | Feb. 10, 1942 |

OTHER REFERENCES

Campbell et al., Proc. Ind. Acad. of Science 50, 87–92 (1941).

Bradsher, J. A. C. S. 64, 1067 (1942; C. A. 36, 3161). (Copy P. O. L.).

Aronheim, A., 171,233, Beil V. 532 C. (Copy P. O. L.)